(12) United States Patent
Vaughn et al.

(10) Patent No.: US 7,140,262 B1
(45) Date of Patent: Nov. 28, 2006

(54) PRECISION VARIABLE AREA FLOWMETER APPARATUS

(75) Inventors: Timothy B. Vaughn, deceased, late of Shallowater, TX (US); by Toni Cline Vaughn, legal representative, Shallowater, TX (US); Norman T. Neher, Elko, MN (US)

(73) Assignee: Vaughn Neher Technology, LLC, Dover, DE (US)

( * ) Notice: Subject to any disclaimer, the term of this patent is extended or adjusted under 35 U.S.C. 154(b) by 0 days.

(21) Appl. No.: 11/122,652

(22) Filed: May 5, 2005

(51) Int. Cl.
*G01F 1/22* (2006.01)
(52) U.S. Cl. .................................. 73/861.57
(58) Field of Classification Search ............. 73/861.56, 73/861.55, 861.57
See application file for complete search history.

(56) References Cited

U.S. PATENT DOCUMENTS

| | | | |
|---|---|---|---|
| 2,258,023 A | 10/1941 | McKemon | |
| 3,582,662 A | 6/1971 | Soika | |
| 3,623,365 A | 11/1971 | Lowell et al. | |
| 3,933,040 A | 1/1976 | Thompson | |
| 4,173,890 A | 11/1979 | Gilmont | |
| 4,200,806 A | 4/1980 | Walker et al. | |
| 4,335,618 A | 6/1982 | Bucsky et al. | |
| 4,566,337 A | 1/1986 | Smart | |
| 4,630,485 A | 12/1986 | Wastl, Sr. et al. | |
| 4,630,486 A * | 12/1986 | Miles et al. | 73/861.56 |
| 4,774,676 A | 9/1988 | Stenzel et al. | |
| 4,864,870 A | 9/1989 | Payne | |
| 5,099,698 A | 3/1992 | Kath et al. | |
| 5,379,651 A * | 1/1995 | Doolittle | 73/861.56 |
| 6,321,604 B1 | 11/2001 | Jackson et al. | |

FOREIGN PATENT DOCUMENTS

JP 2001153697 6/2001

* cited by examiner

*Primary Examiner*—Jewel Thompson
(74) *Attorney, Agent, or Firm*—William R. Berggren; William D. Wiese

(57) ABSTRACT

We have invented an improved apparatus for electronically measuring fluid flow. The apparatus includes a radiation detection means for indicating the position of a flow indicator in a chamber of a variable area flowmeter and has a reliability, versatility and functional accuracy not obtainable with known variable area flowmeters. The invention may also include a variable area flowmeter with the flow indicator in a tapered fluid flow chamber with a wall and a long axis, the chamber having a front side, a back side, and an operational length substantially parallel to the long axis. The invention has no moving parts and is not intrusive so mechanical malfunction and unwanted leaks can not occur. Useful embodiments include, for example, compact self contained apparatus useful for fitting around existing flowmeters, systems that include flowmeters and systems able to work with some fluids that are visually opaque.

24 Claims, 11 Drawing Sheets

Figure 1
Effect of Detector Spacing on Measurement Precision

| Operating Length in mm | Accuracy at Spacing[1] of 1.0 mm in % | Accuracy at Spacing[1] of 0.2 mm in % | Accuracy at Spacing[1] of 0.07 mm in % |
|---|---|---|---|
| 50 | 1.0 | 0.2 | 0.07 |
| 125 | 0.4 | 0.08 | 0.03 |
| 175 | 0.3 | 0.06 | 0.02 |
| 250 | 0.2 | 0.04 | 0.01 |

1 – Spacing is distance from the center of a detector to the center of the neighboring detector where all detectors are arrayed in horizontal and vertical columns and are touching each other.

PRECISION VARIABLE AREA FLOWMETER APPARATUS

FIELD OF THE INVENTION

The present invention relates to variable area flowmeters and, more particularly, to providing an electronic output of flow data from such flowmeters.

BACKGROUND OF THE INVENTION

Variable area flowmeters also known as rotameters have been used as a flow rate monitoring device for several hundred years. One of the limitations has been that rotameters must be visually read in order to determine a flow rate and totalizing was estimated by multiplying the observed flow rate by a time interval. The accuracy of the results was dependent on a correct calibration of the rotameter and an assumption that that the flow rate remained constant over the time interval used in the calculation. When rotameters are used in industry, flow rates can and do vary considerably. Also, when totalization is needed, rotameters without a means of transmitting a signal are frequently unsatisfactory. These difficulties have become more serious in recent years with an increased need for greater reliability and precision. This is particularly true for industries such as semiconductor and pharmaceutical manufacture.

Rotameters have been disclosed with monitoring systems designed to address the problem associated with a need for visual observation. However most of theses systems are at least partly mechanical and contain moving parts that decrease reliability because they are exposed to mechanical failures. A few systems are photoelectronic without moving parts. One, using Charged Coupled Device (CCD) technology has an inherently limited physical range of use that increases system complexity and reduces precision. Another, employing a float shadow detection means and widely spaced light sensors requires complex programming and circuit design and does not achieve precision greater than that available by visually monitoring a graduated scale on the chamber of the flowmeter.

There is still a need for a rotameter system that is more reliable and has greater precision. There is also a need for a more reliable and precise system that can also be retroactively used with existing rotameters.

SUMMARY OF THE INVENTION

We have invented an improved apparatus for electronically measuring fluid flow. The apparatus includes a radiation detection means for indicating the position of a flow indicator in a chamber of a variable area flowmeter with a reliability, versatility and functional accuracy not obtainable with known variable area flowmeters. The invention may also include a variable area flowmeter with the flow indicator in a tapered fluid flow chamber with a wall and a long axis, the chamber having a front side, a back side, and an operational length substantially parallel to the long axis.

One embodiment of the detection means includes a detection means inside an isolated housing having an inside and an outside and encompassing the front and back side of the chamber. Optionally, the housing minimizes adverse influence of ambient radiation. The radiation detection means is temperature-insensitive, stationary, and able to directly monitor the position over the operational length of the chamber. The radiation detection means includes a radiation emitting source proximate to the front side and aligned substantially parallel to the long axis. The radiation detection means also includes a radiation detection assembly comprising a collection of radiation detectors separated from neighboring detectors by a distance 1.0 mm or less from neighboring detectors. The assembly is proximate to the back side and aligned substantially parallel to the long axis.

Another embodiment includes a collimator in the radiation detection assembly for minimizing the effect of radiation between the variable area flowmeter and the collection of radiation detectors coming into the detectors at angles not substantially perpendicular to the long axis.

Still other embodiments include a calculating means for converting data in to useful forms for performing addition al tasks and a communication means for transmitting the forms to other locations where additional actions can occur. The means can be located within the housing or remote from the housing.

Another embodiment includes a detection means designed to sense with infrared radiation tuned to detect the position of a float in opaque fluid.

The invention has many benefits relating to increased reliability, versatility and functional accuracy. Many variable area flowmeters have moving parts or intrusive design features that may be a source of leaks. The invention has no moving parts and is not intrusive so mechanical malfunction and unwanted leaks can not occur. Other flowmeters directly measure float positions but use part shadows and fiber optic extensions. In contrast, the invention directly measures float position over the entire operating range of the flowmeter. Still other flowmeters have functional accuracy no better than that obtainable with visual devices. The apparatus of the invention has functional accuracy that is at least under 1.0% and may be much lower depending on the operational length of the flowmeter and the specific radiation detectors used. In addition, some embodiments of the invention are able to measure float position in visually-opaque fluids. Additional benefits will become apparent as several embodiments are disclosed.

BRIEF DESCRIPTION OF THE DRAWINGS

One or more features or preferred forms of the invention are described in the accompanying drawings. The drawings are briefly described below.

FIG. 1 is a tabular representation of data showing the effect of detector spacing on measurement precision.

For purposes of clarity and brevity, like elements and components will bear the same designations and numbering throughout the FIGURES

DETAILED DESCRIPTION OF SOME EMBODIMENTS OF THE INVENTION

Figure 2:
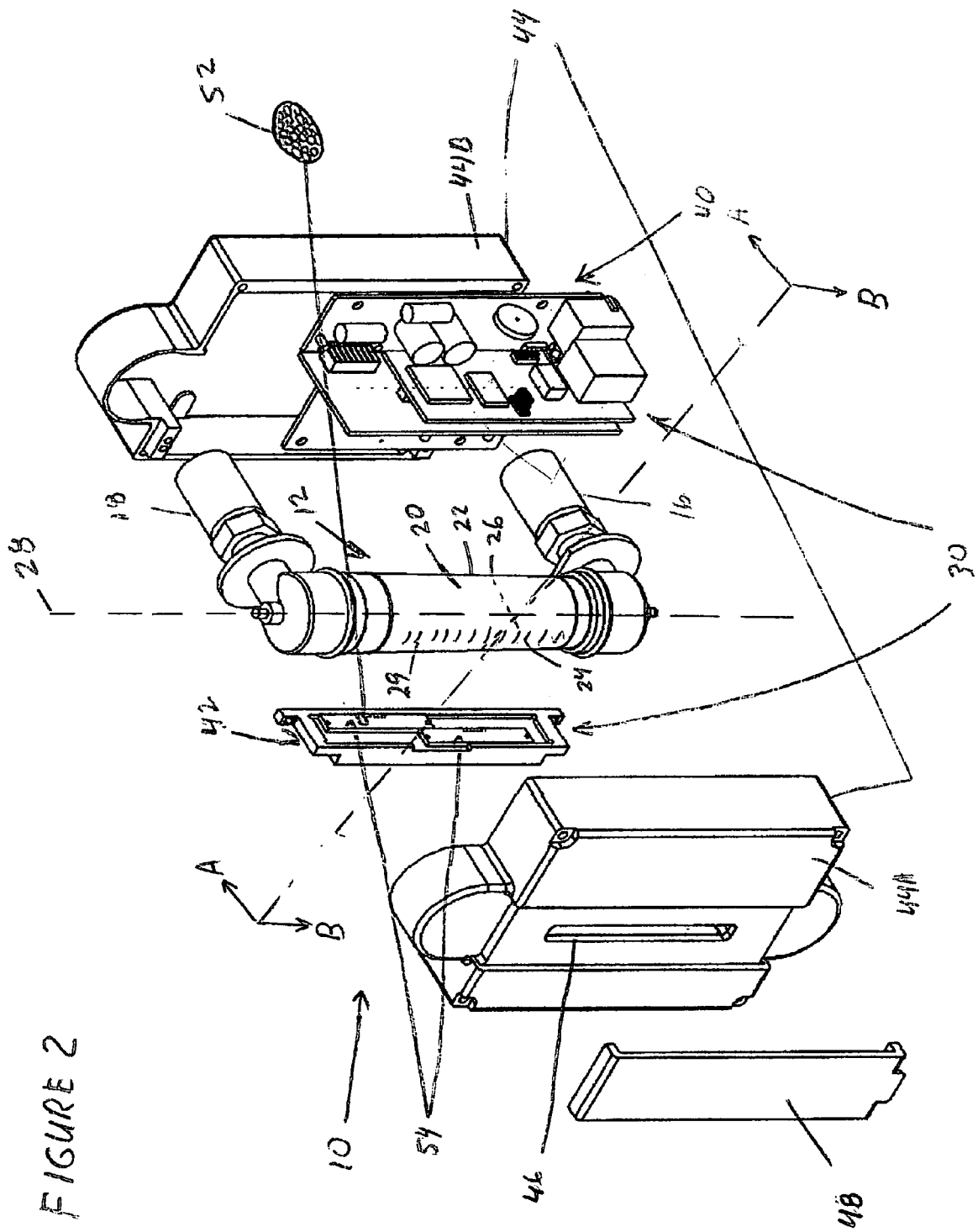
FIG. 2 is an exploded view of an embodiment of the apparatus with two detector boards and filter.

We have invented an improved apparatus for measuring fluid flow that is superior to those known to the art. The apparatus electronically monitors the position of a flow indicator in a variable area flowmeter and includes the flowmeter and radiation detection means for determining location of the flow indicator. While the invention may be used on existing flowmeters and thus may be sold independently of a flowmeter, the following discussion will be about embodiments that include a flowmeter, whether as part of the apparatus or used in combination with electronic detection means invention. The flowmeter generally includes the flow indicator in a tapered fluid flow chamber with a wall and a long axis, the chamber having a front side, a back side, and an operational length substantially parallel to the long axis. These flowmeters are known to the art and have been used in one form or another for many years.

Our invention also includes a radiation detection means for measuring the position of the float in the chamber with a reliability, versatility and functional accuracy not obtainable with known variable area flowmeters. This element can be retroactively applied to existing flowmeters or made in an assembly including the flowmeter.

Reliability of our apparatus is improved over those devices currently known. Our invention is not prone to mechanical failure as it contains no moving parts or intrusive elements. Some known devices use mechanical means to move optical detectors up and down the vertical length of the variable area flowmeter. Others use complex programming routines and measurement of partial shadows to compensate for wide detector spacing. Still others use detector arrays require complex fiber optic linkages to avoid using moving parts to operate over the functional length of the flowmeter. Improved reliability will become more obvious with further discussion of some embodiments of the invention Versatility of our apparatus is significantly broader than that of currently available devices. Our apparatus is able to operate with flowmeters handling a wider variety of fluids including visually opaque fluids. We are also able to provide direct measurement of float positions without moving any parts regardless of the operation al length of the flowmeter. In addition, our device is not adversely affected by changes in temperature. Increased versatility will become apparent as some specific embodiments are discussed below.

Functional accuracy of our device is beneficial in many applications and is also superior to that available in known devices. Industries such as, for example, semiconductor chip, agricultural chemical and pharmaceutical industries require increasing precision in their manufacturing processes that are often remotely controlled. Accuracy of a flowmeter is adversely affected by many variables, including for example, physical variations in individual flowmeters when average calibration curves are used, temperature and pressure of fluids passing through the flowmeter, and errors in visually reading a scale. Variable area flowmeters that are visually observed have a bulk average range of measurement of plus or minus five percent (±5%), also called ten percent (10%) accuracy. The accuracy is generally improved to plus or minus one percent (±1%) or two percent (2%) for an individual flowmeters if the calibration curve is determined from an individual calibration. This accuracy is reduced and the measurement becomes less reliable as wear effects of moving parts influence measurement.

Electronic sensing flowmeter detection devices can be more precise than visual detection flowmeters. The theoretical increase in measurement precision becomes more functional if fluid variations of pressure and temperature are monitored and accounted for and the detection devices are not adversely influenced by temperature. FIG. 1 shows tabulated calculations of three flowmeters with different functional operating lengths. Radiation detection detectors were used with center-to-center spacing of various distances. The error in measurement of the position of a float is the distance of the center-to-center space or ± half the spacing. The percent error in a measurement is the spacing divided by the operational length of the flowmeter. As seen, the error for flowmeters with a length of 50 millimeters (mm) was 1.0, 0.2, and 0.03 for spacings of 1.0, 0.2 and 0.03 mm, respectively. Longer lengths resulted in less error. This precision can be increasingly beneficial as the other causes of error are minimized. Our invention permits a reduction of those other causes of error; and also improved reliability and increased versatility.

Figure 3:
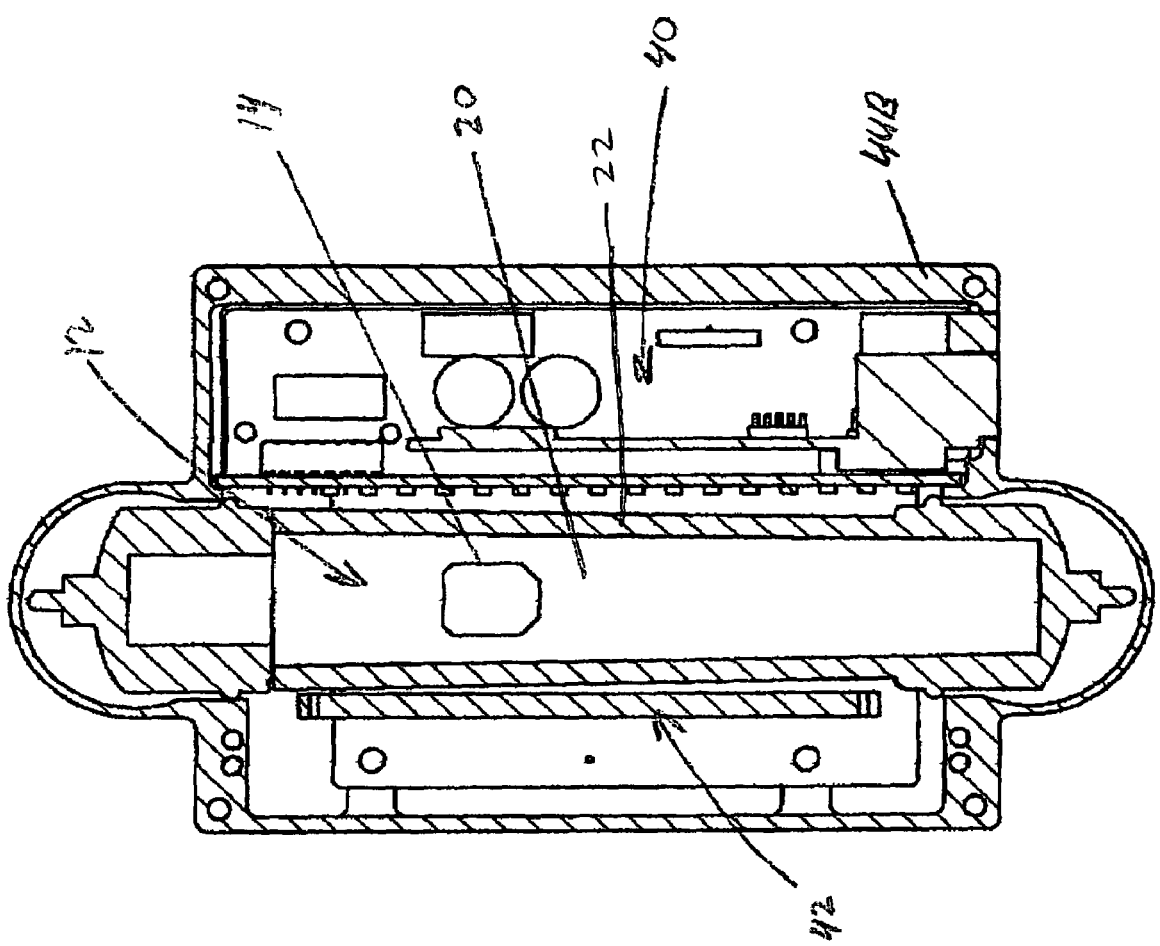
FIG. 3 is front view of an embodiment of the apparatus of FIG. 2.
Figure 4:
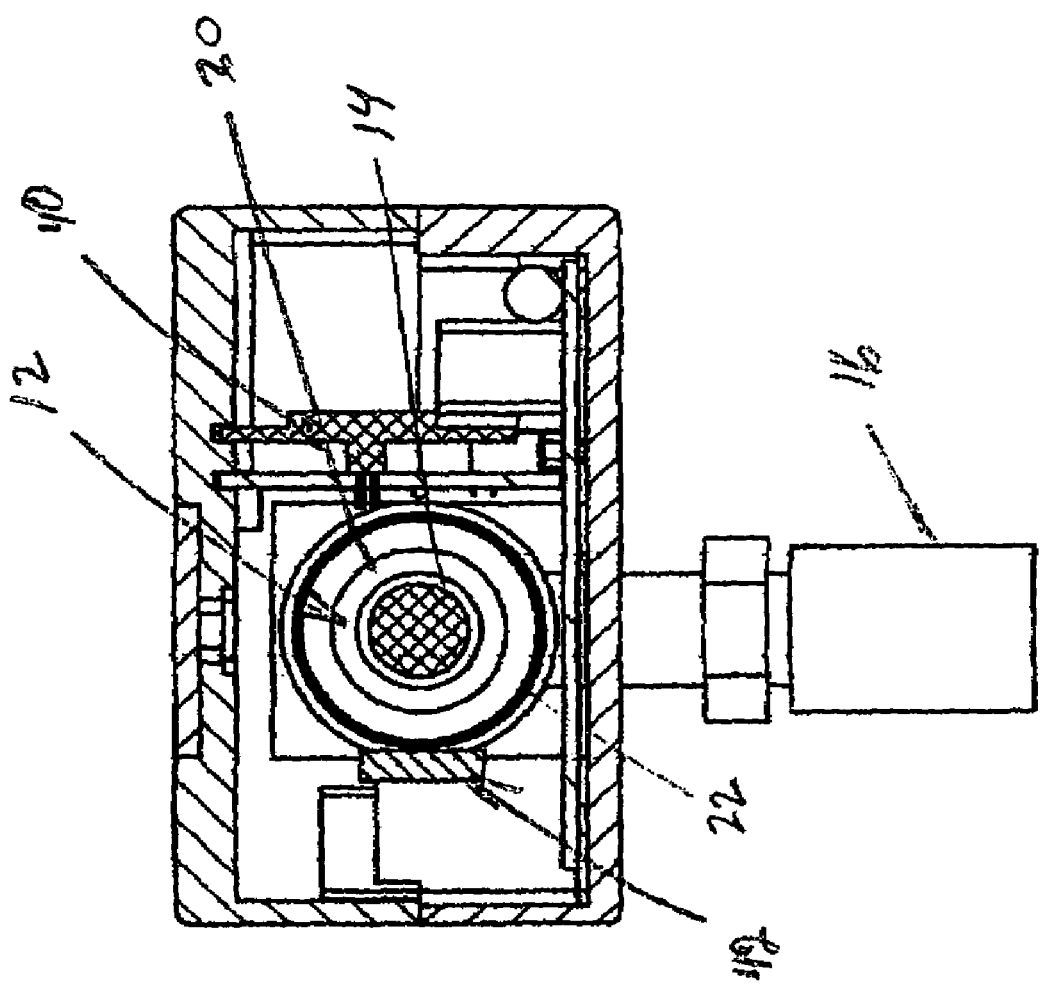
FIG. 4 is a top view of the apparatus of FIG. 2.

The invention can be better understood by more closely describing several embodiments. One embodiment of the apparatus is shown in FIG. 1, as an exploded view of apparatus 10 containing a variable area flowmeter. A front view along section view AA is shown in FIG. 2 and a top view along section view BB is shown in FIG. 3. Variable area flowmeter 12 is shown with flow indicator or float 14, flow in port 16 and flow out port 18 and a chamber 20. The chamber has a wall 22 a front side 24, a back side 26, a long axis 28 and typically graduations 29 marked on a side of the wall to indicate position of indicator 14 in the operating length of chamber 20. The operational length is generally parallel to the long axis of the chamber, the indicator moves up the chamber as flow of a fluid through the meter increases and down as it decreases. Apparatus 10 also includes a radiation detection means 30 for indicating the position of flow indicator 14 within the operating length of chamber 20. Radiation detection means 30 is stationary, able to directly monitor the position over the operational length of the chamber, and temperature insensitive for several reasons. First, the electronics of the detection means operate with digital signals, which are inherently temperature insensitive rather than temperature sensitive analog signals. Second, the calculating means, discussed later, monitors temperature and pressure of a fluid passing through the flowmeter and electronically adjusts monitoring position data to reflect changes influenced by changes in fluid temperature and fluid pressure.

Radiation detection means includes radiation emitting source 40 and radiation detection assembly 42. The radiation emitting source is a source able to emit radiation that is transmissive through the fluid and is blocked by the indicator. The source is proximate to front side 24 of chamber 20 and aligned substantially parallel to long axis 28. Emitted radiation may range from infrared, to visible, to ultraviolet depending on the demands on the apparatus. For example, visible radiation is suitable when the indicator is visible through the fluid and the fluid is not sensitive to exposure to visible radiation. Ultraviolet radiation is suitable when the fluid is reactive to infrared and visible radiation but not ultraviolet. Infrared radiation is suitable when the fluid is opaque enough to visible radiation to conceal the position of the indicator under visible conditions but not under infrared radiation. Other situations are also apparent where a particular radiation source would be preferred.

Radiation emitting sources are common and well known. Sources include, for example, incandescent and fluorescent sources. A useful visible radiation emitting source has been found to be light emitting diodes (LED) available, for example as QTLP282-2 from Fairchild Corp. A useful infrared radiation emitting source is an infrared LED such as an OED-EL-23A-TR from Lumex Corp. A useful ultraviolet radiation emitting source is a UV light tube available as UV-BF#-OV1 from JKL Components Corp.

Infrared sensing radiation detection means is particularly useful and heretofore not completely appreciated, and significantly increases the versatility of variable area flowmeter versatility. Disclosures such as Walker et al, U.S. Pat. No. 4,200,806, have mentioned use of infrared radiation detectors but with translucent or transparent chambers. Surprisingly, we have found that the infrared signal can distinguish flow indicator positions in opaque fluids or through opaque chambers. Generally strong signals are useful for working with fluids that are sensitive to visible radiation but have little if any ability to discriminate. We found that if the infrared signal intensity is made weaker, the signal can discriminate between some materials used as flow indicators and other materials used as flow chambers or as fluids that are normally opaque under visible radiation conditions. Intensity control functions can be incorporated within the radiation detection means to permit identification of the intensity that permits discrimination. Because the properties of infrared radiation permit this radiation wavelength to penetrate certain materials whether they are solid, liquid or some combination thereof, embodiments of the present invention are able to sense changes in flow rates of fluids that may be opaque to visible light, thus considerably expanding the type of fluids that can be metered using a variable area flowmeter.

Radiation detecting assembly 42 includes a collection of radiation detectors 52 on one or more circuit boards 54. The detectors are proximate to back side 24 of chamber 20 and aligned substantially parallel to long axis 28. The detectors have center to center spacing distances to neighboring detectors of no more than 1.0 mm, preferably no more than 0.2 mm and more preferably no more than 0.07 mm. These spacing s result in detection errors of substantially less than available from visual detection.

Radiation detection assembly 42 can be any that has detectors with spacing distances of no more than 1.0 mm and can be attached in series to span the operation al length of the chamber. As shown in FIG. 1 and previously discussed, spacing distances of 1.0 mm or less for functional flowmeter lengths of at least 50 mm result in error in the accuracy of indicator position of less than one percent (1.0%), the generally recognized lower limit of error range for visual readings of indicator position. Easy ability to link circuit boards containing radiation a detector array permits detector assemblies to span the entire functional length of the chamber without the need of mechanically moving parts or cumbersome fiber optic connections coupled with wider spacing distances. Preferably the detectors are sensitive enough to distinguish a position of the indicator by detecting transmissive radiation but not too sensitive to be confused by radiation emitted from neighboring emitting sources at angles other than perpendicular to the long axis. Such greater sensitivity requires lenses or collimators between the flowmeter and the radiation emitting source. Examples of detectors that are of preferable sensitivity as well as have desirable spacing distances and can be linked in series are CMOS detectors that are typically used in digital cameras, copiers, cell phones, and scanners and are available from Texas Advanced Optoelectronics Solutions, Inc., of Plano, Tex. Two types are more preferable because of their spacing distances. The first is TSL208R with 512 pixels on a circuit board and spacing distances of 0.13 mm (200 detectors per inch). The second is TSL1410R with a spacing distance of 0.06 (400 detectors per inch).

In contrast, charged coupled devices (CCD) that are typically used in similar areas as CMOS detectors are not suitable for this application. Panels of CCD detectors are generally manufactured in standardized lengths of 51 mm (2 inches) or less and are not economically available in longer or custom lengths. In addition, CCD panels are not known to be linkable in series when used with variable area flowmeters. This is due to fundamental differences in their manufacturing requirements and cannot be readily altered. This length restriction requires a radiation detector assembly made with CCD detectors to mechanically move to different sensing regions as the indicator moves beyond the operation al length of the detector panel. Alternatively, a series of fiber optic cables may be employed to connect each detector to a series of locations spanning the operating range but with greater spacing distances. In addition, the enhanced sensitivity of CCD detectors require the use of collimators or lenses between the radiation emitting source and the flowmeter to light not emitted perpendicular to the long axis.

The operation al length can be any length. There is no theoretical limit to the circuit boards containing the detectors as they can be easily linked or custom made. The apparatus shown in FIG. 2 has two detector arrays, to cover the full range of chamber 20. Each circuit board has an accompanying illumination source and optional collimator (discussed later). Conversely, a chamber may be shorter than the length of a given detector array board. The range of active pixels or detectors is programmable in order to accommodate such applications. There are no specific design requirements to cover the entire length of a flowmeter with detectors. In contrast, a length of over 75 mm (3 inches) would require a flow rate monitoring apparatus using CCD detectors to be mobile or use fiber optic cables to span the length.

Also shown is an isolated housing 44 having two halves, a front half 44A and a back half 44B. The housing has an inside 46 and an outside 48, and encompasses the front and back of the chamber as well as the radiation detection means. As seen, back half 44B is designed with holes to fit around flow in port 16 and flow out port 18 as they connect to respective fluid transportation limes upstream and downstream. Front half 44A also has an optional view port 46 to enable visual inspection of the flow indicator position by observation of the indicator relative to graduations 30 and an optional view port cover 48 for keeping ambient light from adversely interfering with the radiation detection means unless visual observation is desired. The housing also provides a means for generating a positive internal pressure within the housing by way of a tube fitting (not shown) supplied with air or some other gas. This permits displacement of atmosphere within the housing with a medium that is not adversely reactive to means within the housing.

Ambient radiation is radiation from sources other than the radiation emitting source of the apparatus. Ambient radiation may adversely influence indicator position detection under some circumstances. When using a radiation detection assembly comprising CMOS type detectors, a flash light shined on the detector assembly will overload the detectors tuned for detecting visible radiation and result in the sensors recording a maximum radiation emission whether or not the indicator blocks radiation from the radiation emitting sources. However, ambient radiation is not an issue when detecting flows in a lights-out factory or when using radiation detection assemblies designed for infrared or ultraviolet radiation detection. Versatility is enhanced when ambient radiation is restricted by the housing from adversely interfering with radiation detection means.

The radiation detection means may also comprise a filtering means 49 for removing unnecessary radiation spectral components that interfere with the detection of the position of the flow indicator. This can be done, typically, by optical means, such as, for example, by passing the radiation through a colored transparent plastic film.

Figure 5:
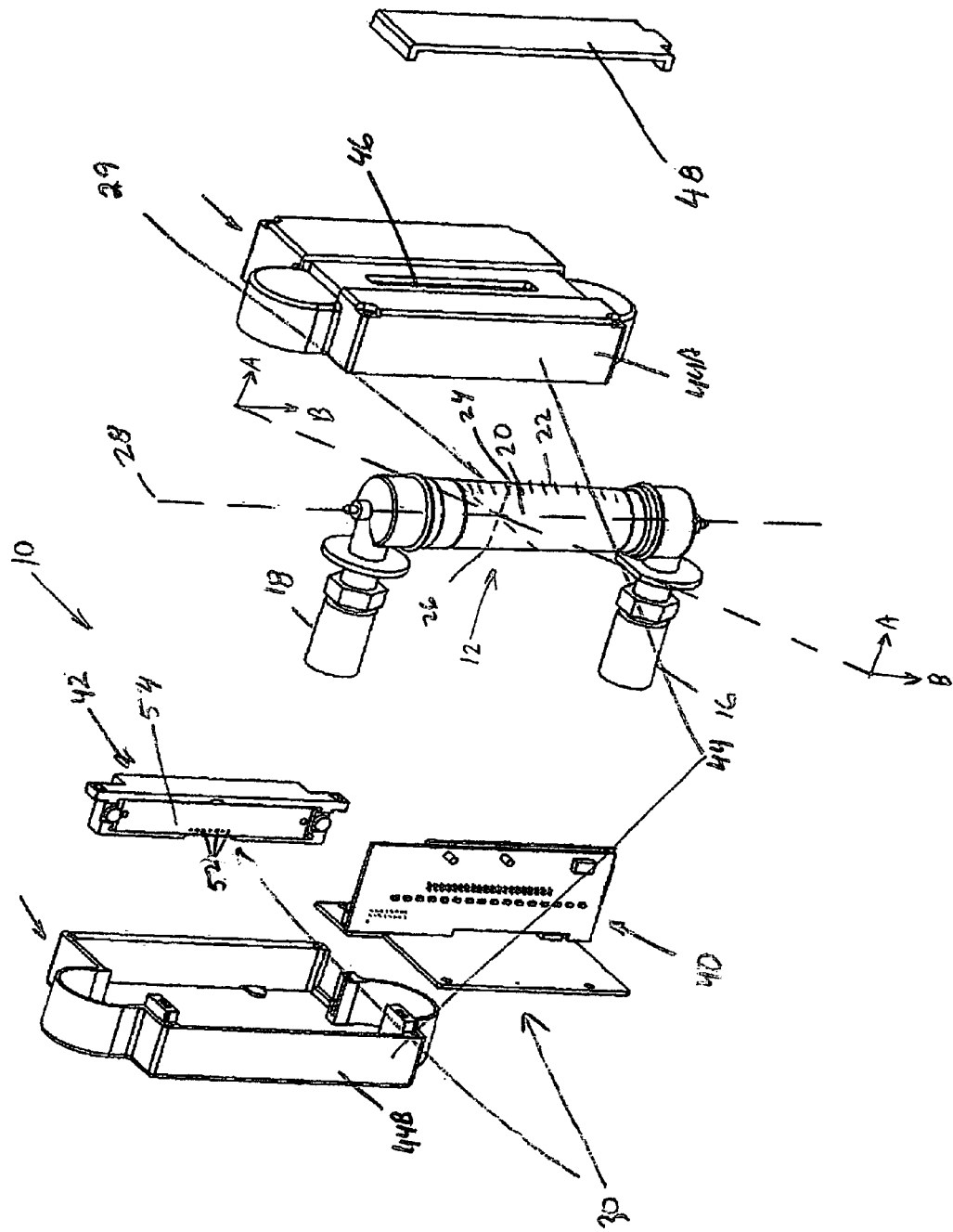
FIG. 5 is an exploded view of an embodiment of the apparatus with a collimator between a variable area flowmeter and a radiation detection array.
Figure 6:
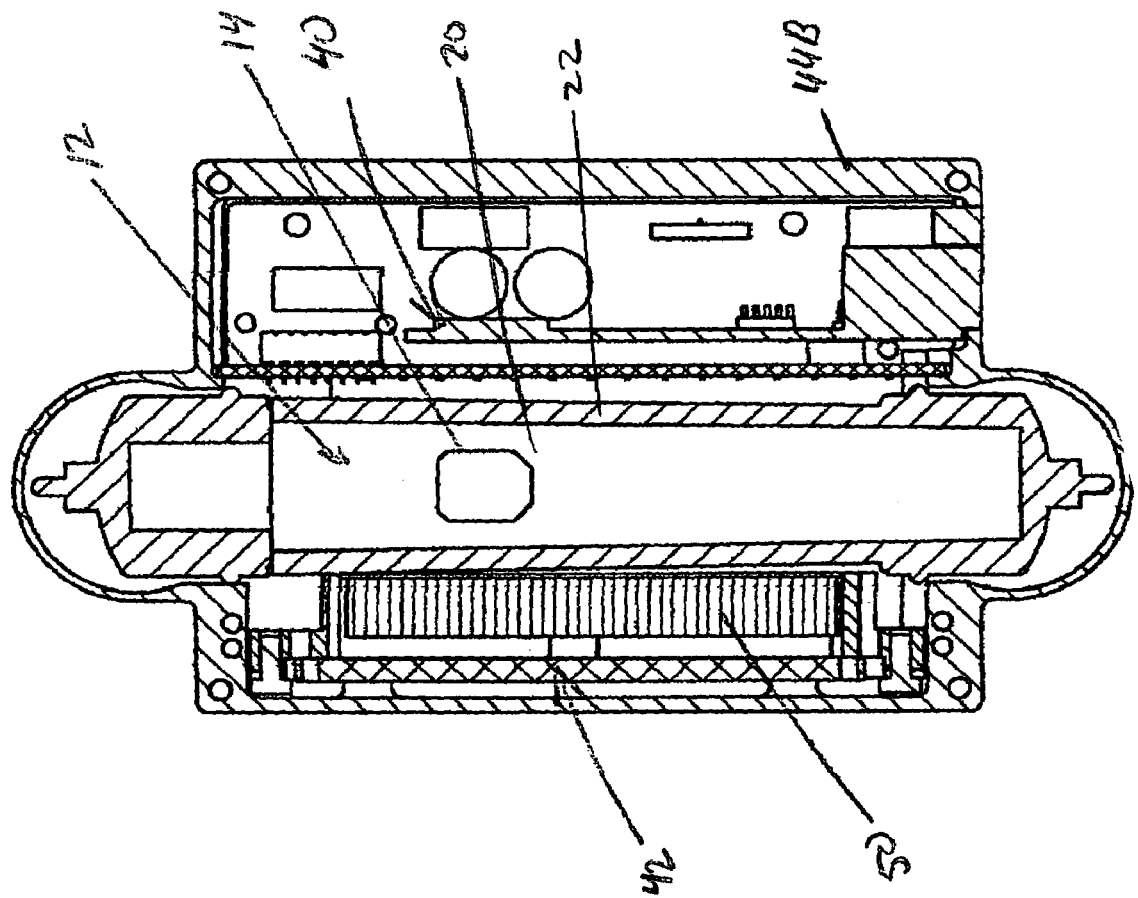
FIG. 6 is front view of an embodiment of the apparatus of FIG. 5.
Figure 7:
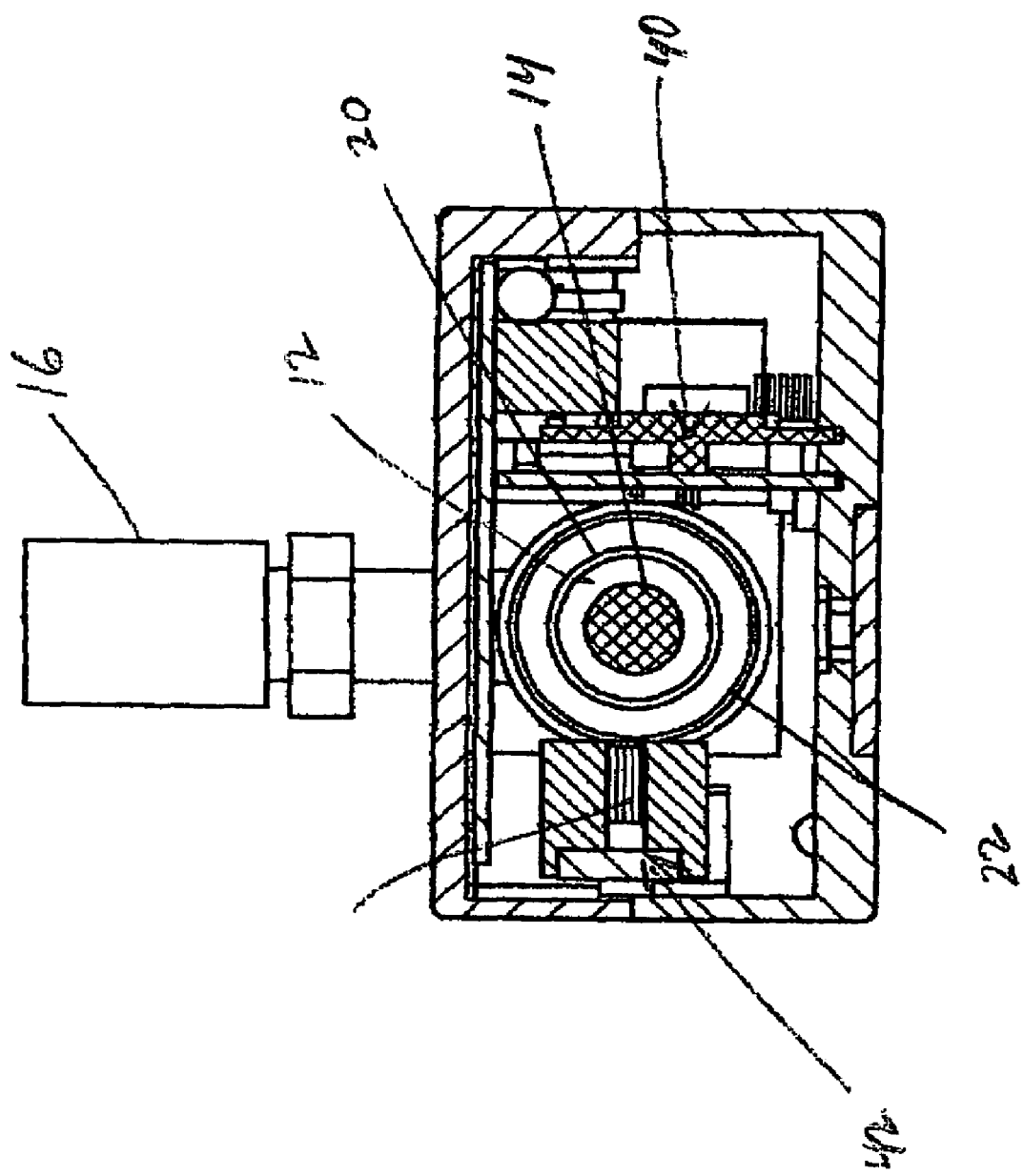
FIG. 7 is a top view of the apparatus of FIG. 5.

Another embodiment of the apparatus is shown in FIG. 5, as an exploded view of apparatus 10 where a collimator 50 is used. A front view along section view AA is shown in FIG. 6 and a top view along section view BB is shown in FIG. 7. Collimator 50 is placed between back side 26 of chamber 30 and radiation assembly 42. The collimator is a series of lenses designed to block emitting radiation that has passed through the flowmeter chamber at angles substantially different from that perpendicular to the long axis from contacting the radiation detectors. This optional element is preferable as it results in a further increase in accuracy of the radiation detection means for measuring indicator position.

The collimator functions as a highly directional lens means for transmitting light that has passed through the chamber 20. One useful form of lens array is that sold as SELFOC.RTM from Nippon Sheet Glass Company Limited to Osaka, Japan. The lens array has a short conjugate (i.e., the distance between an object and a focused image), that can be as small as 9 mm, providing a compact, high precision collimator. The array is comprised of one or two rows of cylindrical-shaped lenses sandwiched between a pair of fiberglass-reinforced plates having a coefficient of thermal expansion that is the same as the glass lenses. A silicon resin fills the voids within the regions of the inner plates and end plates. The lenses are transparent rod-like elements and, in a preferred form, are approximately 1.9 mm (0.075 inch) in diameter. The array approximately matches the length of radiation detection assembly 42. The lenses have one-to-one optical power, and the image in each lens is inverted twice and merged with the images from neighboring lenses.

Figure 8:
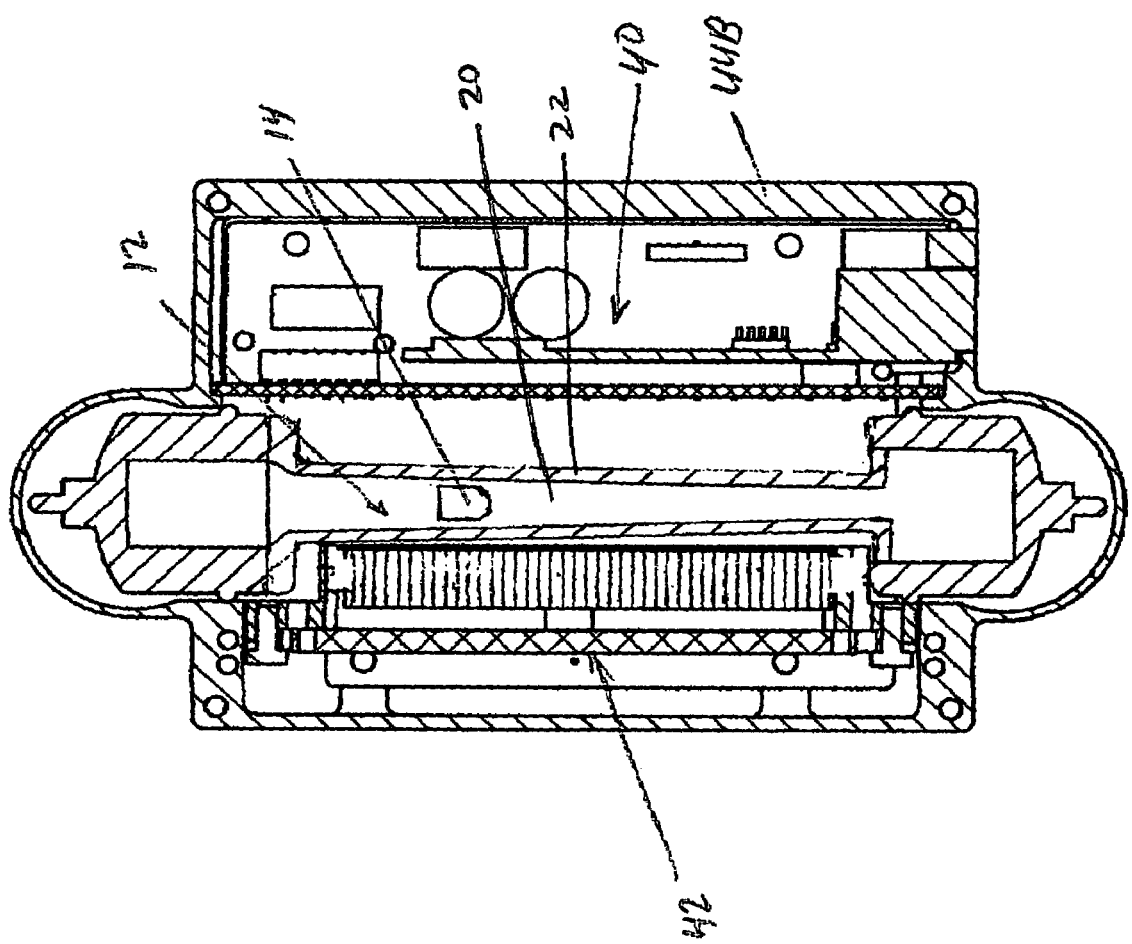
FIG. 8 is a front view of the apparatus of FIG. 5 with a variable area flowmeter having a smaller diameter.

Another embodiment of the apparatus is shown in FIG. 8, as an exploded view of apparatus 10 similar to that shown in FIGS. 5, 6 and 7, where a smaller flowmeter 12 is used. As seen, the apparatus of the invention can be used with existing rotameters of a variety of sizes.

The radiation detection means can also comprise a calculating means for processing sufficient information to obtain flow rate measurements. The calculating means includes an electronic assembly and a microcomputer. The calculating means can be located external to the apparatus or internal as shown. The associated electronics for performing the necessary functions to convert detected radiation obtained from a particular position of the flow indicator relative to the long axis of the chamber into useful information that can be relayed, transmitted or broadcast in a useful manner or simply visually interpreted in the form of an alphanumeric electronic readout. The calculating means also is able to adjust the output signal to result in curve-fitting and volumetric flow information. In addition, the calculating means is able to adjust the output signal in response of variations in pressure and temperature of the fluid in the flowmeter where such fluid characteristics are monitored and programs used in fluid handling processes are in place to utilize such information effectively.

The calculating means can also comprise communication means to pass information from a calculation means to locations able to use the information. The location includes controllers and valves that are able to cause beneficial action in reaction to the information. The communication means includes means to relay, transmit, broadcast or visually indicate useful information. The means also is able to allow information to pass to at least one computer network comprising at least one computer through any known means including means selected from the group consisting of broadcast, wire or fiber optic.

In operation, the radiation emitting source is positioned to project radiation throughout the chamber that is shadowed by the flow indicator. The shadow is projected on the collection of radiation detectors in the radiation detection assembly. Electronics sense the lower voltage from the detectors, also known as pixels, caused by the shadow and trigger the programs to generate a signal proportional to the indicator position relative to the chamber. As the radiation from the emitting source impinge upon the detector array and the detectors thereof, photons cause the detectors to develop an electrical charge or voltage thereon. The more photons that hit a particular detector will cause the charge being created therein to be higher. A microprocessor in a computer has a clock that generates a series of pulses when its operation is initiated. The pulses are progressively applied to each of the detectors on the first detector array board or chip and then progressively applied to the detectors on a second detector array board and so on until the clock pulses have been progressively applied to all of the detectors on all of the detector array boards. When such a cycle of operation of the microprocessor has been completed, a signal initiation signal is applied to the clock in order to initiate a new cycle of operation. As the pulses from the clock are progressively applied to each of the detectors, each will in turn respond by producing an analog voltage output signal.

Figure 9:
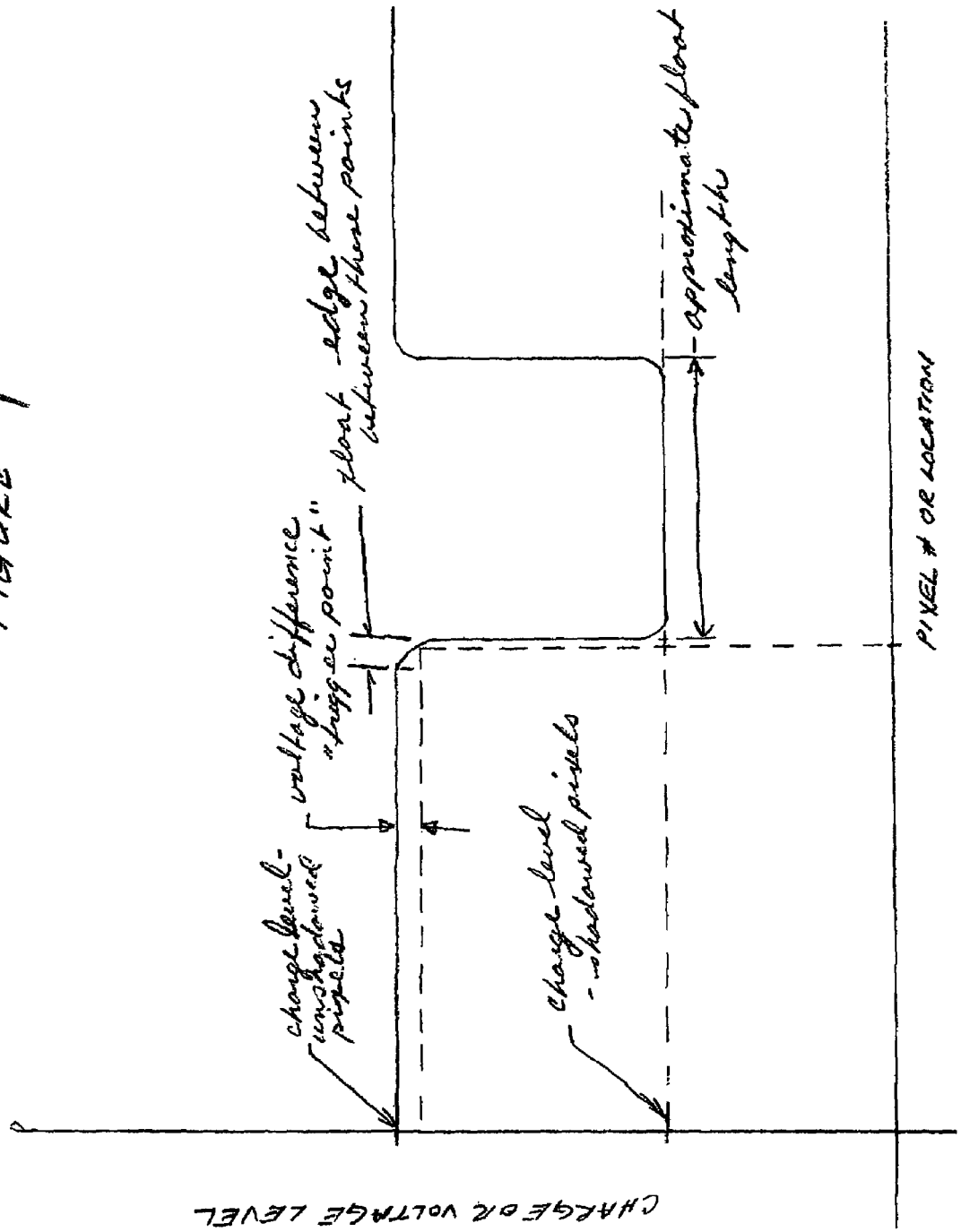
FIG. 9 is a graph of an output signal showing the location of a flow indicator.

FIG. 9 is a graphic representation of detector or pixel charge versus detector identification within a single detector array board. The shadowed detectors will produce voltage output signals which have substantially lower magnitude than the unshadowed detectors. Illustrated is a charge vs. detector or pixel location plot showing the linear position of each of the detectors in the detector array and a relative charge on each detector. The curve represents the voltage level of each of the detectors during a typical scan. The charge state of each of the detectors is represented by its vertical position and the individual location of the detector is represented by its horizontal position. The charge state of unshadowed detectors will be constant. When the flow indicator is between the radiation emitting source and the detection assembly, the detector charge is much lower as represented by the dip in the charge versus detector position curve. The length of the flow indicator, in this case cylindrically or spherically shaped, is approximated by the number of shadowed detectors represented by the dip in the curve. A digitizing means or comparator in the microprocessor converts the analog voltage output signals to binary output when the analog voltage drops below a predetermined level that is below the unshadowed voltage charge level as shown by the trigger point. This trigger point is programmable. The flow indicator position can be sensed by using either the upper edge or the lower edge of the indicator in the case of a cylindrical or spherical indicator. In the case of a long conic-shaped indicator, there is only the upper edge that will create a shadow as the lower edge is not present from a shadowed detection perspective.

Figure 10:
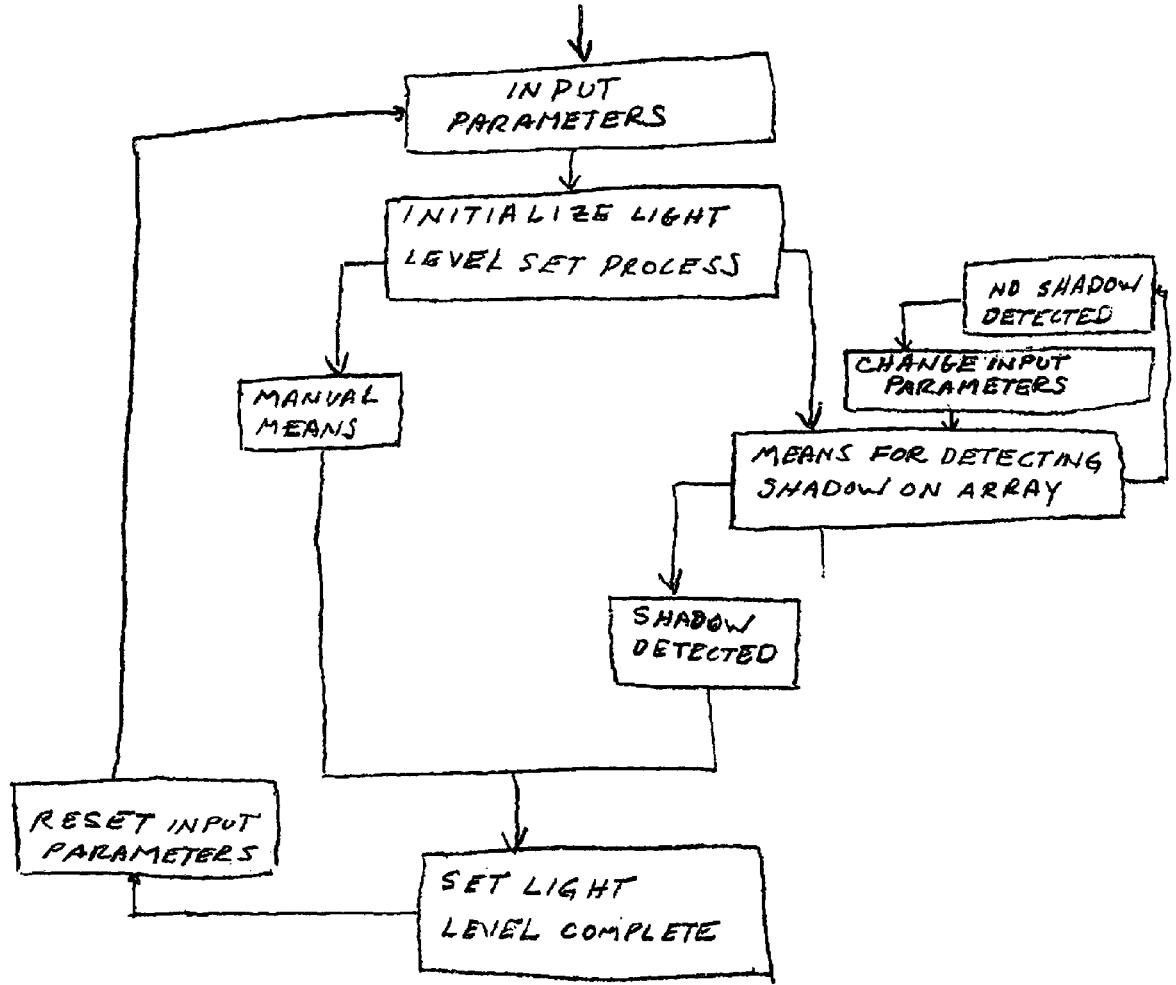
FIG. 10 is a programming logic flowchart of the circuitry controlling radiation selection.

FIG. 10 is an illustration of the programmable steps a microcomputer follows to determine signal intensity able to distinguish a flow indicator position. Input parameters are first set including an initial radiation intensity level. Then determination is made of whether discrimination is achieved, i.e., by a selected change in voltage between a shadowed detector and an unshadowed detector. If no shadow is detected, the input parameters are changed and the process is repeated until a shadow is detected. When that occurs, the light intensity level determination step is completed. This process is particularly useful when infrared radiation is used and the flow indicator cannot be visually discriminated from the fluid or chamber.

Figure 11:
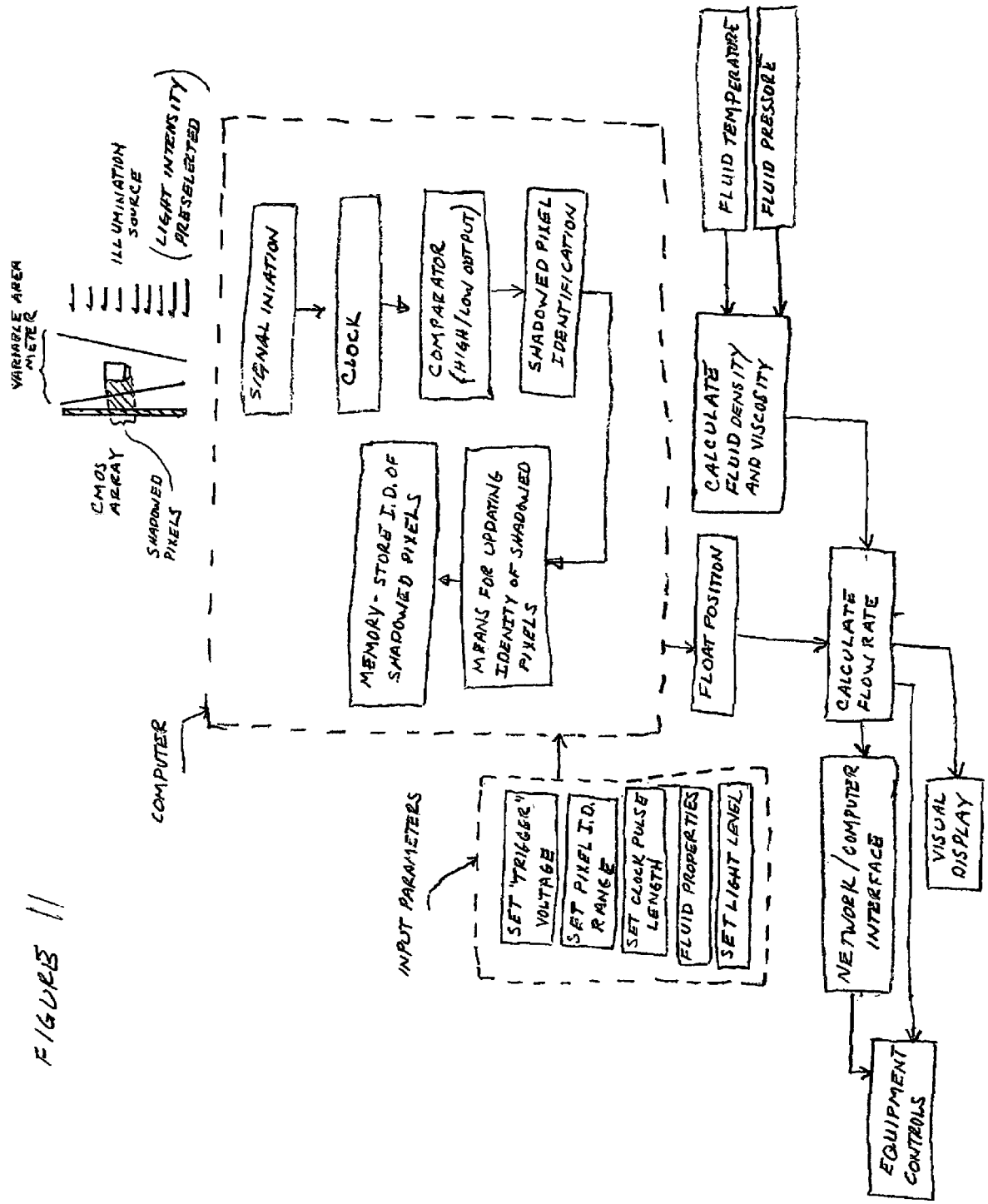
FIG. 11 is a programming logic flowchart of the calculation means, communication means, and intensity control means of the apparatus of FIG. 5.

FIG. 11 illustrates a programming logic flowchart of the calculation means, communication means, and intensity control means of the apparatus depicted in FIGS. 5, 6 and 7. Shown are the functions of the radiation detection means and its microprocessor, and network and user interfaces. The flow indicator within the chamber interrupts the light from the illumination source creating the shadow against the detector array and output signals from, the detectors. A microcomputer then processes the information. The microcomputer, typically a single board computer, consists of signal initiation means, a microprocessor, a clock, a comparator that converts the analog voltage signals to binary output, detector or pixel identification means, means for updating identity of shadowed detectors, and memory for storing identification of shadowed detectors. An analog output voltage signals are progressively applied to the digitizing means or comparator in the microprocessor which converts the analog voltage output signals to binary output signals. The microprocessor has been programmed for detector identification so that each of the detectors or pixels on each detector array has a suitable identification.

The microcomputer typically performs the following tasks. As the clock pulses induce analog voltage output signals to be transmitted from the detectors to the comparator, and as the comparator digitizes those signals, each of the analog output signals for each of the pixels 42 is transmitted to the means for updating the identity of shadowed detectors. The information concerning the identity of shadowed detectors is then transmitted into the memory. When the memory has received updating information for the whole detector array, the memory will cause initiation of the initiation signal again so as to start the clock operating again to repeat its generation of clock pulses to each detector. As the clock generates its pulses progressively into each detector array board or chip, the last pulse will obtain from the detector array an end-of-scan pulse. The end-of-scan pulse is fed into the next detector array board as a beginning-of-scan pulse in order to commence the progressive application of clock pulses into each detector array board. The microprocessor continues to scan the detectors and obtain the output signals there from. It then stores the information concerning each of the detectors in the memory so that the single board computer continues to have up-to-date information about the identity and location of each of the detectors that have been shadowed.

The microprocessor also includes a means to integrate the identified detectors with the identification of the shadowed detectors in the memory so that this information may be transmitted to a network-computer interface, control system or both when requested.

The network-computer interface connects the microprocessor to a user-programming interface. The user-programming interface contains user-programmable features or input parameters. The clock pulse length can be programmed to adjust the time between clock pulses as this will modify the number of photons that reach the detectors in the radiation detection assembly during each scan. The set detector identification range function can be set in the event that all the detectors in the detector array are not used. The set trigger voltage function controls the voltage that is sent to a comparator that converts analog signals from the detectors to digital information. The user-programming interface can be output to an alpha-numeric display for direct flow rate and/or totalization readout. The user-programming interface can be output to equipment controls that may use the information generated by the apparatus.

The user-programming interface has the facility to request identification of the shadowed detectors in all the length of the chamber, and will receive information from the microprocessor for this purpose. The information concerning the request of shadowed detectors will be used to produce the output information indicating flow rate information whether it is in the form of voltage or current signals or directly into units of volume, mass or weight units per unit time. This information may be directed to the display or to the equipment controls, or both. The user-programming interface also has a facility for revising the number, range and order of sensed detectors in each detector array (set detector identification range). This facility accommodates the use of various designs of variable area flowmeters that may have unique flow measuring requirements.

The user-programming interface also has a facility to revise the clock pulse length generated by the clock in order to change the number of photons which will reach the detectors between scans. The clock pulse length may be important to obtaining a clear operation of the equipment for use with various types of fluids that are available, as the different fluids will absorb variable amounts of light.

The user-programming interface also has the facility to revise the voltage level, or trigger voltage, that the comparator uses to convert the analog signals from the detectors into digital information. This may be important in the event that the flow indicator geometry does not produce a distinct shadow or that the said clock pulse length adjustment is not sufficient to allow for the variable photon absorption levels created by different fluid types.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

We claim:

1. An apparatus for measuring fluid flow, comprising,
radiation detection means for indicating the position of a float in a chamber of a variable area flowmeter with a reliability, versatility and functional accuracy not obtainable with known variable area flowmeters,
a variable area flowmeter with a flow indicator in a tapered fluid flow chamber with a wall and a long axis, the chamber having a front side, a back side, and an operational length substantially parallel to the long axis, and
a radiation detection assembly comprising a collection of radiation detectors separated from neighboring detectors by a distance of less than 1.0 mm from neighboring detectors, proximate to the back side and aligned substantially parallel to the long axis, wherein the radiation detection means is able to encompass the operating length of the variable area flowmeter.

2. The apparatus of claim 1 wherein the detection means, comprises,
an isolated housing having an inside and an outside and encompassing the front and back side of the chamber and
the radiation detection means placed inside the housing, the detection means being temperature-insensitive, stationary, and able to directly monitor the position over the operational length of the chamber, wherein the radiation detection means comprises, and
a radiation emitting source proximate to the front side and aligned substantially parallel to the long axis.

3. The apparatus of claim 2 wherein the housing is able to minimize adverse exposure to the radiation detection means from ambient light.

4. The apparatus of claim 2 wherein the radiation detection means further comprises intensity adjustment means to select radiation that discriminates between the float and both the chamber and a fluid passing through the chamber.

5. The apparatus of claim 1 wherein the radiation detection means further comprises a collimator between the back side and the radiation detectors.

6. The apparatus of claim 2 wherein the operating length is over 75 millimeters (3 inches).

7. The apparatus of claim 2 wherein the collection of radiation detectors are grouped in detector arrays that are connected in series to span the operating length.

8. The apparatus of claim 2 wherein the radiation is able to be selected to be sufficiently transmissive to permit satisfactory detection from the radiation detectors when fluid is transported through the chamber and satisfactory blockage of transmission by the flow indicator.

9. The apparatus of claim 2 wherein the radiation from the radiation emitting sources has a wavelength selected from a group consisting of infrared, visible or ultraviolet.

10. The apparatus of claim 2 wherein the radiation detection means further comprises a filtering means for removing unnecessary radiation spectral components that interfere with the detection of the position of the flow indicator.

11. The apparatus of claim 2 wherein housing further comprises a purge means for to permit displacement of atmosphere within the housing with a medium that is not adversely reactive to means within the housing.

12. The apparatus of claim 2 wherein the detection means, further comprises,
an calculating means inside the housing to convert detected radiation obtained from a particular position of the flow indicator relative to the long axis of the chamber into useful information and
a communication means to pass information from a calculation means to locations able to use the information.

13. The apparatus of claim 2 wherein the detection means further comprises a calculating means to convert detected radiation obtained from a particular position of the flow indicator relative to the long axis of the chamber into useful information.

14. The apparatus of claim 13 wherein the calculating means comprises an electronic assembly and a microcomputer suitable to process sufficient information to obtain flow rate measurements having an accuracy associated with an error in length of the chamber along the long axis of less than 0.2 mm.

15. The apparatus of claim 13 wherein the calculating means comprises an electronic assembly and a microcomputer suitable to process sufficient information to obtain flow rate measurements having an accuracy associated with an error in length of the chamber along the long axis of less than 0.07 mm.

16. The apparatus of claim 13 wherein the calculating means is able to adjust the output signal to result in curve-fitting and volumetric flow information.

17. The apparatus of claim 13 wherein the calculating means is able to adjust the output signal in response of variations in pressure and temperature of the fluid in the flowmeter.

18. The apparatus of claim 13 wherein the detection means further comprises a communication means to pass information from the calculation means to at least one location able to use the information.

19. The apparatus of claim 18 wherein the location includes controllers and valves that are able to cause beneficial action in reaction to the information.

20. The apparatus of claim 18 wherein the communication means is able to allow information to pass to at least one computer network comprising at least one computer through any known means including means selected from the group consisting of broadcast, wire or fiber optic.

21. The apparatus of claim 18 wherein the communication means includes means to relay, transmit, broadcast or visually indicate.

22. An apparatus for measuring the float position of a variable area flowmeter, comprising,
a variable area flowmeter with a flow indicator in a tapered fluid flow chamber with a wall and a long axis, the chamber having a front side, a back side, and an operational length substantially parallel to the long axis;
an isolated housing having an inside and an outside and encompassing the front and back side of the chamber; and
a radiation detection means for measuring the position of the float in the chamber with an reliability, versatility and functional accuracy not obtainable with known variable area flowmeters placed inside the housing, the detection means being temperature-insensitive, stationary, able to directly monitor the position over the operational length of the chamber, wherein the radiation detection means comprises,
a radiation emitting source proximate to the front side and aligned substantially parallel to the long axis, and
a radiation detection assembly comprising a collection of radiation detectors separated from neighboring detectors by a distance less than 1.0 mm from neighboring detectors, proximate to the back side and aligned substantially parallel to the long axis.

23. The apparatus of claim 22 wherein the housing is able to minimize exposure of the radiation detection assembly to adverse levels of ambient radiation.

24. An apparatus for measuring the float position of a variable area flowmeter, comprising,
a variable area flowmeter with a flow indicator in a tapered fluid flow chamber with a wall and a long axis, the chamber having a front side, a back side, and an operational length substantially parallel to the long axis;
an isolated housing having an inside and an outside and encompassing the front and back side of the chamber; and a radiation detection means for measuring the position of the float in the chamber with an reliability, versatility and functional accuracy not obtainable with known variable area flowmeters, the means placed inside the housing and being temperature-insensitive, stationary, able to directly monitor the position over the operational length of the chamber, wherein the radiation detection means comprises, a radiation emitting source proximate to the front side and aligned substantially parallel to the long axis, and a radiation detection assembly comprising a collection of radiation detectors separated from neighboring detectors by a distance less than 1.0 mm from neighboring detectors, proximate to the back side and aligned substantially parallel to the long axis; and an adjustment means for selecting radiation characteristics able to discriminate between flow indicator position and fluid passing through flowmeter to permit detection of indicator position through visually opaque fluids.

* * * * *